United States Patent
Li et al.

(10) Patent No.: US 12,263,457 B2
(45) Date of Patent: Apr. 1, 2025

(54) HOMOGENIZATION APPARATUS FOR PEPPER RAW MATERIALS

(71) Applicant: CHONGQING DEZHUANG AGRICULTURAL PRODUCTS DEVELOPMENT CO., LTD., Chongqing (CN)

(72) Inventors: Dejian Li, Chongqing (CN); Shubang Lu, Chongqing (CN); Li Zhang, Chongqing (CN); Decai Zhou, Chongqing (CN); Qinsong Yue, Chongqing (CN); Yangmei Li, Chongqing (CN); Yi Tang, Chongqing (CN)

(73) Assignee: CHONGQING DEZHUANG AGRICULTURAL PRODUCTS DEVELOPMENT CO., LTD., Chongqing (CN)

( * ) Notice: Subject to any disclaimer, the term of this patent is extended or adjusted under 35 U.S.C. 154(b) by 863 days.

(21) Appl. No.: 17/402,611

(22) Filed: Aug. 16, 2021

(65) Prior Publication Data

US 2021/0370249 A1 Dec. 2, 2021

Related U.S. Application Data

(63) Continuation of application No. PCT/CN2020/136159, filed on Dec. 14, 2020.

(30) Foreign Application Priority Data

Dec. 25, 2019 (CN) .......................... 201911359639.8

(51) Int. Cl.
 B01F 7/24 (2006.01)
 A23L 19/00 (2016.01)
 (Continued)

(52) U.S. Cl.
 CPC ............ *B01F 27/921* (2022.01); *A23L 19/01* (2016.08); *B01F 27/213* (2022.01); *B01F 2101/06* (2022.01)

(58) Field of Classification Search
 CPC ........ B01F 33/81; B01F 33/812; B01F 29/40; B01F 27/2123; B01F 35/71775;
 (Continued)

(56) References Cited

U.S. PATENT DOCUMENTS

2012/0147696 A1 6/2012 Swader

FOREIGN PATENT DOCUMENTS

| CN | 107670552 A | 2/2018 | |
| CN | 107824113 A * | 3/2018 | ............ B01F 13/105 |

(Continued)

OTHER PUBLICATIONS

International Search Report of PCT Patent Application No. PCT/CN2020/136159 issued on Mar. 10, 2021.

*Primary Examiner* — Elizabeth Insler

(57) ABSTRACT

A homogenization apparatus for pepper raw materials, including a base, and an annular storage tank and a stirring barrel fixed to the base. The stirring barrel is positioned under the storage tank, the bottom center of the stirring barrel is fixedly connected to a stationary shaft, the stirring barrel is rotationally drivable to rotate together with the stationary shaft about the axis of the stationary shaft, the stationary shaft extends upward into the storage tank, a sleeve is provided on an outer side of the stationary shaft, the sleeve is rotatably connected to the stationary shaft, so that the stirring barrel rotates relative to the storage tank; a portion of the sleeve accommodated in the stirring barrel is fixedly connected with a stirring part, an upper end of the stationary shaft is fixedly connected with a connecting plate.

10 Claims, 3 Drawing Sheets

(51) Int. Cl.
  *B01F 7/00* (2006.01)
  *B01F 27/213* (2022.01)
  *B01F 27/921* (2022.01)
  *B01F 101/06* (2022.01)
(58) Field of Classification Search
  CPC ...... B01F 2101/06; B01F 29/81; B02C 23/02; A23L 19/01
  See application file for complete search history.

(56) References Cited

FOREIGN PATENT DOCUMENTS

| | | | |
|---|---|---|---|
| CN | 108354211 A | | 8/2018 |
| CN | 108722296 A | | 11/2018 |
| CN | 109012292 A | | 12/2018 |
| CN | 109012379 A | * | 12/2018 |
| CN | 208543632 U | | 2/2019 |
| CN | 111001335 A | | 4/2020 |

* cited by examiner

HOMOGENIZATION APPARATUS FOR PEPPER RAW MATERIALS

CROSS-REFERENCE TO RELATED APPLICATION

This application is a continuation of international application of PCT application No. PCT/CN2020/136159 filed on Dec. 14, 2020, which claims the priority benefit of China application No. 201911359639.8 filed on Dec. 25, 2019. The entirety of each of the above-mentioned patent applications is hereby incorporated by reference herein and made a part of this specification.

BACKGROUND

Technical Field

The present application relates to the technical field of food processing equipment, and more particularly, to a homogenization apparatus for pepper raw materials.

Description of Related Art

Pepper pungency degree is classified into mildly pungent, moderately pungent, highly pungent and very highly pungent according to human perception. Currently, our company produces different pepper powder products based on pepper raw materials of different pungency degrees. However, pepper purchased from various regions has differences in pungency degree, due to pepper's planting and growth climates. Even though the capsaicin contents of the same variety are different, degree of pungency varies. Thus, the produced pepper powder products have non-uniform pungency degree, and some pepper powders have different pungency degrees with the calibrated pungency degrees.

In order to solve the above problems, our company filed an invention patent of CN108354211A, a pepper pretreatment equipment for reducing the pungency degree difference of the hotpot condiment is characterized in that different batches of pepper powders are uniformly mixed through a storage mechanism, a rotating mechanism and a stirring structure, so that the pungency degree difference is reduced.

However, in actual production process, the storage mechanism is annular, and if there are differences in the pepper powders fed to each portion of the discharge hopper, the stirring structure cannot homogenize the pepper powders at each portion of the discharge hopper, and thus there is still a small difference in the pungency degree of the pepper powders finally taken out by the take-out mechanism.

SUMMARY

The present application aims to provide a homogenization apparatus for pepper raw materials with a specific pungency degree, which solves the problem in the prior art that there is still a small difference in the pungency degree of the pepper powders.

The basic technical solutions are as follows: a homogenization apparatus for pepper raw materials, including a base, and an annular storage tank and a stirring barrel which are coaxially arranged with the base and respectively fixed to the base, the stirring barrel is positioned under the storage tank, the bottom center of the stirring barrel is fixedly connected to a stationary shaft, the stirring barrel is rotationally drivable to rotate together with the stationary shaft about the axis of the stationary shaft, the stationary shaft extends upward into the storage tank, a sleeve is provided on an outer side of the stationary shaft, the sleeve is rotatably connected to the stationary shaft, so that the stirring barrel rotates relative to the storage tank; a portion of the sleeve accommodated in the stirring barrel is fixedly connected with a stirring part, an upper end of the stationary shaft is fixedly connected with a connecting plate, one end of the connecting plate away from the stationary shaft extends into the storage tank and is connected with a rotatable stirring shaft, and a plurality of stirring blades are fixed to the stirring shaft; an inner wall of the storage tank is provided with a plurality of discharge chutes leading to the stirring tank, and the stirring shaft and the stationary shaft are connected via a transmission assembly.

The advantageous effects: after laying the pepper powders layer by layer in the storage tank, as long as the stirring barrel and the storage tank are relatively rotated under a power device, that is, the stationary shaft is made to rotate with respect to the sleeve, and then the stirring shaft and the stirring blades are made to move along the annular storage tank, during the movement, the transmission assembly enables the stirring shaft and the stirring blades to rotate, so that the pepper powders can be uniformly mixed in the storage tank. During the stirring process, the pepper powders at each portion of the storage tank falls from the discharge chute into the stirring barrel due to the stirring action, and the relative movement of the stirring part and the stirring barrel achieves remixing of the pepper powders. Compared with the prior art, this solution reduces the cost, while further reducing the difference in the pungency degree of the pepper powders.

Further, the transmission assembly includes a primary bevel gear fixed to the sleeve and a secondary bevel gear which is arranged on the connecting plate and meshed with the primary bevel gear.

Compared with other transmission structures, the bevel gear is large in transmission torque and convenient for power steering.

Further, the transmission assembly further includes a transmission pulley fixedly connected to the secondary bevel gear and the stirring shaft respectively, a transmission part is connected between the transmission pulleys, and the transmission part includes a belt or a chain.

The belt and the chain can change the path according to the shape of the connecting plate, for example, at a bend, the steering pulley can be used for steering conveniently. Since the transmission part will follow the movement of the connecting plate, after the belt or the chain changes the path along with the connecting plate, the chain or the connecting plate is less affected by the outside, and the stability is guaranteed.

Further, the connecting plate is fixedly connected to a right-angled plate, and the secondary bevel gear is arranged on the right-angled plate and rotatably connected to the right-angled plate.

When compared to the case that the secondary bevel gear is directly rotatably connected to the connecting plate, the secondary bevel gear is disposed on the right-angled plate, which can reduce a lot of steering transmission parts, thereby minimizing the transmission energy loss.

Further, a housing is fixedly connected to the connecting plate at a position corresponding to the transmission pulley on the stirring shaft.

The house can prevent the pepper powders from entering between the transmission part and the transmission pulley, thereby affecting the stability of the transmission.

Further, the stirring barrel is rotatably connected to the base, the stirring barrel is connected to a driving means, the base is fixed with a rack, and the storage tank is fixedly connected to the rack. In this way, the driving means can drive the stirring barrel to rotate relative to the storage tank.

Further, the stationary shaft is further fixedly connected with a straight flat plate, and the straight flat plate is rotatably connected with a feed pipe. When the stirring barrel rotates relative to the storage tank, the feed pipe moves along the storage tank, thereby laying the pepper powders layer by layer in the storage tank.

Further, the stirring barrel is fixedly connected to the base, the base is fixed with a rack, the storage tank is rotatably connected to the rack, and the storage tank is connected to a driving means. In this way, the driving means drives the storage tank to rotate relative to the stirring barrel.

Further, a discharge gap is provided between the sleeve and the stationary shaft, and the sleeve is communicated with a discharge pipe. The discharge pipe is connected to a negative pressure pump, and the pepper powders can be sucked out from the stirring barrel, thereby realizing discharge.

Further, the stirring part includes a spiral blade. Compared with a traditional straight stirring rod, the spiral blade can circumferentially stir the pepper powders, and meanwhile, the pepper powders can be vertically raised and flipped, thereby improving the stirring effect.

DESCRIPTION OF THE EMBODIMENTS

Hereinafter, the present application is further illustrated in detail in combination with the specific embodiments.

Embodiment 1

Figure 1:
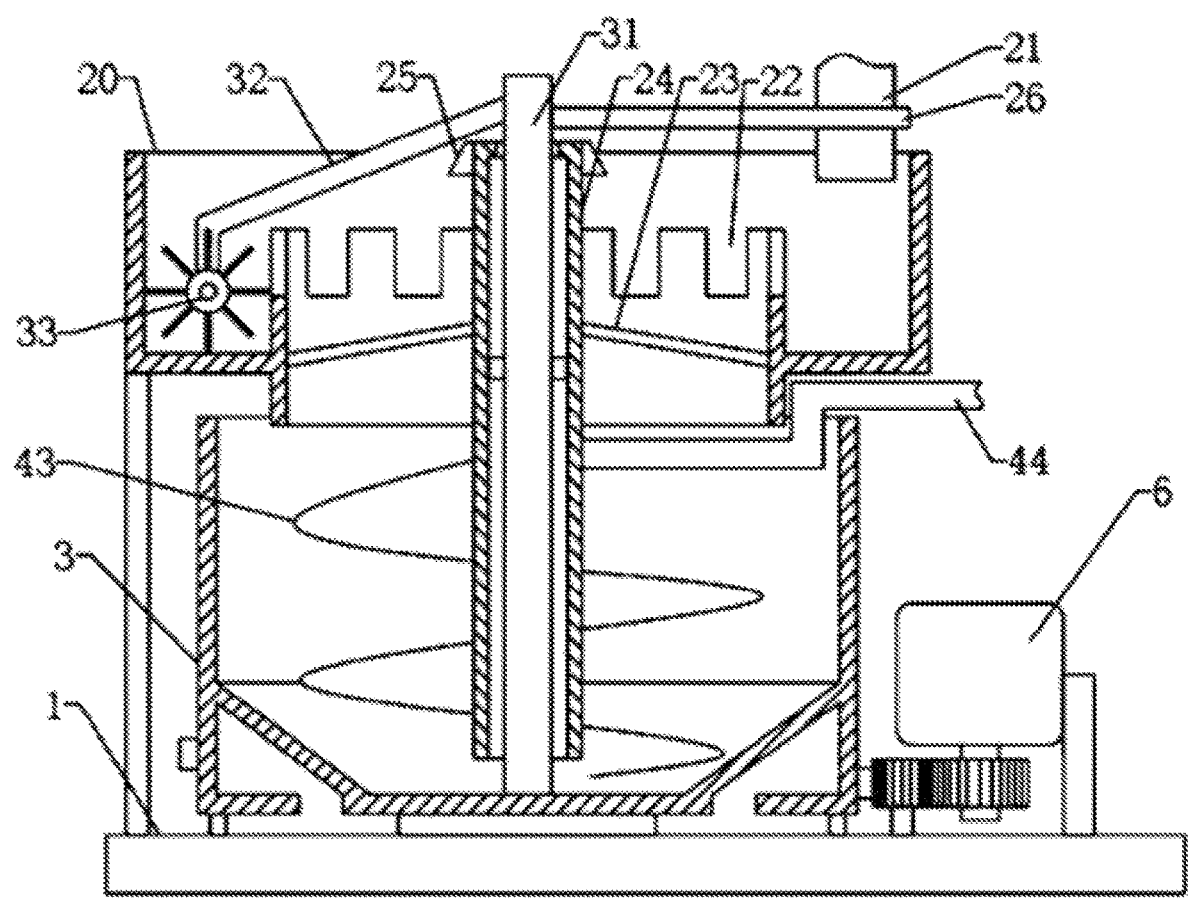
FIG. 1 is a schematic sectional view of Embodiment 1 of the present application.

As shown in FIG. 1, disclosed is a homogenization apparatus for pepper raw materials with a specific pungency degree, in which a base 1 is included, a stirring barrel 3 and a storage tank 20 are arranged on the base 1, the storage tank 20 is positioned over the stirring barrel 3, the storage tank 20 and the stirring barrel 3 are coaxially arranged, and the storage tank 20 and the base 1 are fixed via a rack. The storage tank 20 is annular, the inner wall of the storage tank 20 is lower than the outer wall thereof, and a plurality of discharge chutes 22 are formed in the inner wall of the storage tank 20.

The center of the storage tank 20 is a through hole, the through hole is provided with a sleeve 24, the sleeve 24 and the storage tank 20 are coaxially arranged, and a plurality of connecting rods 23 are welded on the outer wall of the sleeve 24, and the connecting rods 23 are all welded and fixed to the inner wall of the storage tank 20. The lower end of the sleeve 24 extends into the stirring barrel 3 and is fixedly connected with a spiral blade 43.

The lower end of the stirring barrel 3 is rotatably connected to the base 1 via a rotating shaft and a bearing, an annular rack is fixed on the outer circumferential wall of the stirring barrel 3, the rack is meshed with an intermediate gear, the intermediate gear is rotatably connected to the base 1, the intermediate gear is meshed with a power gear, and the power gear is connected with a motor 6 fixed to the rack.

A stationary shaft 31 is fixedly connected in the stirring barrel 3, the stationary shaft 31 is coaxial with the sleeve 24, and a discharge gap with the width of about 2 cm is provided between the stationary shaft 31 and the inner wall of the sleeve 24. The middle of the sleeve 24 is communicated with a discharge pipe 44, the discharge pipe 44 extends through a gap between the upper end of the stirring barrel 3 and the lower end of the storage tank 20, and the discharge pipe is connected to a negative pressure pump after extending out.

The stationary shaft 31 is rotatably connected to the upper end of the sleeve 24 through a bearing. An upper end of the stationary shaft 31 is welded with a connecting plate 32, and one end of the connecting plate 32 away from the stationary shaft 31 is vertically bent and extends into the storage tank 20. A stirring shaft 33 is rotatably connected to one end of the connecting plate 32 in the storage tank 20, and a plurality of stirring blades are fixed on the stirring shaft 33. The upper end of the stationary shaft 31 is further fixedly connected with a straight flat plate 26, one end of the straight flat plate 26 away from the stationary shaft 31 is provided with a vertical through hole, and a feed pipe 21 is rotatably connected in the vertical through hole, and the feed pipe 21 is a flexible hose.

Figure 2:
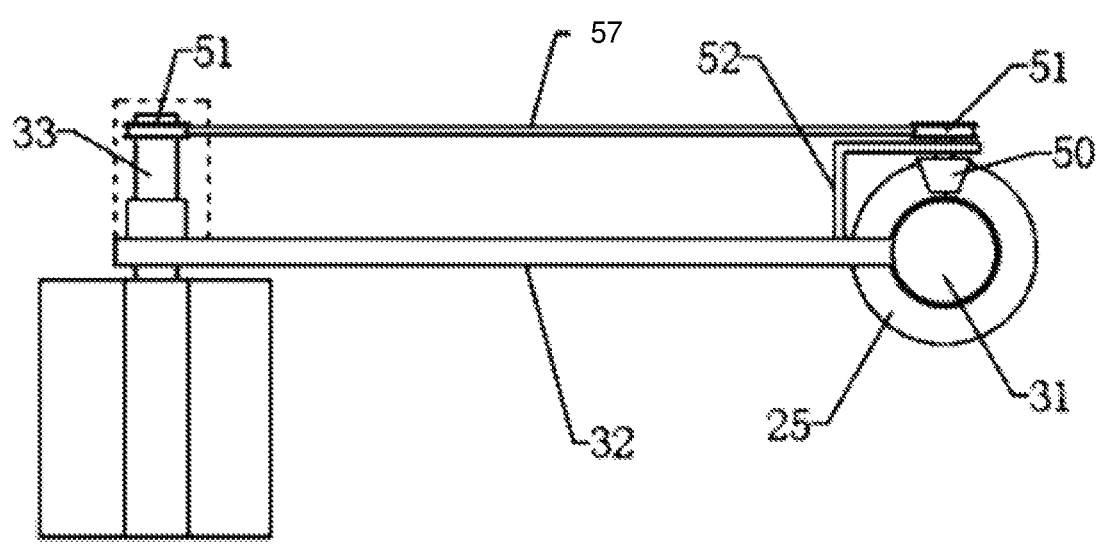
FIG. 2 is a schematic top view of the transmission assembly of FIG. 1.

The stirring shaft 33 and the sleeve 24 are connected via a transmission assembly. The transmission assembly includes a primary bevel gear 25 fixed at an upper end of the sleeve 24. As shown in FIG. 2, the connecting plate 32 is fixedly connected to a right-angled plate 52, and the right-angled plate 52 is rotatably connected to the secondary bevel gear 50 which is meshed with the primary bevel gear 25. The secondary bevel gear 50 is coaxially fixedly connected to a transmission pulley. The transmission pulley is a belt pulley 51, and the stirring shaft 33 is also fixedly connected to the belt pulley 51. A looped belt 57 is connected between the two belt pulleys 51. A protective housing (as shown by dashed lines in FIG. 2) is fixedly connected to the connecting plate 32 at a position corresponding to the belt pulley 51 on the stirring shaft 33. As shown in FIGS. 1 and 2, a steering pulley (not shown) is rotatably connected at a bending position of the connecting plate 32, and the steering pulley can steer the belt 57, so that the belt 57 extends from the primary bevel gear 25 to the stirring shaft 33 along the shape of the connecting plate 32.

When in use, the pepper powder processed in the previous step is continuously fed into the storage tank 20 from the feed pipe 21, and after the motor 6 is started, the motor 6 drives the stirring barrel 3 to rotate through the rack. When the stirring barrel 3 rotates, the stationary shaft 31 rotates with the stirring barrel 3, the stationary shaft 31 drives the stirring shaft 33 and the feed pipe 21 to move circumferentially along the storage tank 20, and when the feed pipe 21 moves circumferentially, pepper powders in different time periods can be laid in the storage tank 20 layer by layer. As shown in FIG. 2, the stirring shaft 33 moves circumferentially in a counterclockwise direction relative to the center of the stationary shaft 31. The secondary bevel gear 50 moves circumferentially relative to the primary bevel gear 25, so as to enable the secondary bevel gear 50 to rotate relative to the right-angled plate 52. The secondary bevel gear 50 rotates to drive the belt pulley 51 to rotate. Finally, the stirring shaft 33 and the stirring blade are driven by the belt 57 to rotate, so that the stirring shaft 33 and the stirring blade rotate counterclockwise as shown in FIG. 1. Thus, the pepper powder in the storage tank 20 is stirred.

During the stirring process, if the stirring shaft 33 moves to the position of the discharge chute 22, the stirring blade can push out part of the pepper powders at each portion of the storage tank 20 from the discharge chute 22. The pushed-out pepper powder falls into the stirring barrel 3. Since the stirring barrel 3 rotates continuously, while the sleeve 24 is fixed to the storage tank 20, the stirring barrel 3 rotates relative to the spiral blade 43 on the sleeve 24, and the stirring barrel 3 rotates relative to the spiral blade 43 with the pepper powder so as to realize the stirring of the pepper powder again.

During the stirring process of the spiral blade 43, the negative pressure pump generates a negative pressure in the discharge pipe 44, and the pepper powder in the stirring barrel 3 can be sucked out from the discharge gap between the sleeve 24 and the stationary shaft 31, thereby realizing discharge.

Embodiment 2

Figure 3:
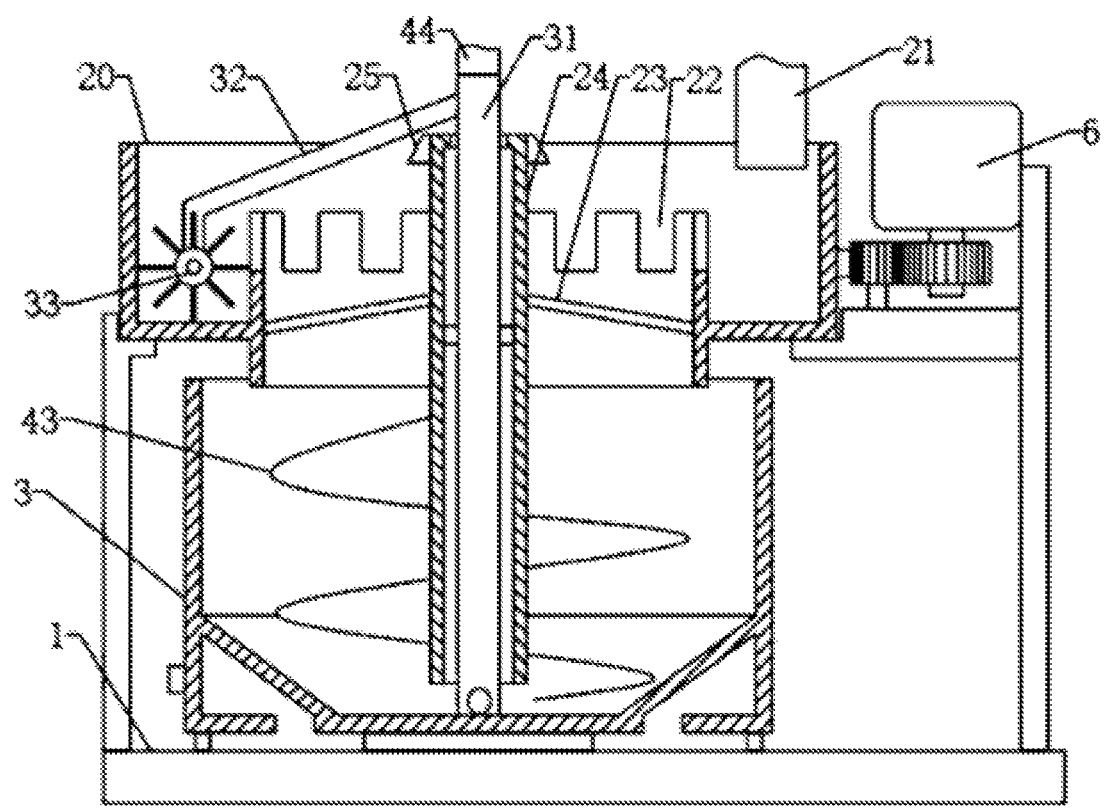
FIG. 3 is a schematic sectional view of Embodiment 2 of the present application.

The difference from Embodiment 1 lies in that, as shown in FIG. 3, the discharge pipe 44 is fixed to the rack, the stationary shaft 31 is of a hollow structure, the lower end of the stationary shaft 31 is provided with a through hole communicating with the stirring barrel 3, and the feed pipe 21 communicates with the upper end of the stationary shaft 31 and is connected with a negative pressure pump. The feed pipe 21 is fixed to the rack, the storage tank 20 is rotatably connected to the rack, an annular rack is fixed on a circumferential surface of the storage tank 20, an intermediate gear, a power gear and a motor 6 are connected to the rack, the intermediate gear is rotatably connected to the rack, the power gear is fixed on an output shaft of the motor 6, and the motor 6 is fixed to the rack.

In this way, the motor 6 drives the storage tank 20 to rotate, the spiral blade 43 rotates relative to the stirring barrel 3. Compared with Embodiment 1, the motor 6 drives the storage tank 20 to rotate in this embodiment.

These embodiments are merely explanatory of the application, and common knowledge such as the specific structure and characteristics in the technical solution is not described herein. It should be noted that, for a person skilled in the art, several variations and modifications can be made without departing from the structure of the present application, and these should also be regarded as the protection scope of the present application, which will not affect the effects and patentability of the present application. The protection scope of the present application is defined by the appended claims, and the description such as the specific embodiments in the specification can be used to interpret the content of the claims.

What is claimed is:

1. A homogenization apparatus for pepper raw materials, comprising a base, and an annular storage tank and a stirring barrel coaxially arranged with the base and respectively arranged on the base, wherein, the stirring barrel is positioned under the storage tank, the bottom center of the stirring barrel is fixedly connected to a stationary shaft, the stirring barrel is rotationally drivable to rotate together with the stationary shaft about the axis of the stationary shaft, the stationary shaft extends upward into the storage tank, a sleeve is provided on an outer side of the stationary shaft, the sleeve is rotatably connected to the stationary shaft, so that the stirring barrel rotates relative to the storage tank; a portion of the sleeve accommodated in the stirring barrel is fixedly connected with a stirring part, an upper end of the stationary shaft is fixedly connected with a connecting plate, one end of the connecting plate away from the stationary shaft extends into the storage tank and is connected with a rotatable stirring shaft, and a plurality of stirring blades are fixed to the stirring shaft; an inner wall of the storage tank is provided with a plurality of discharge chutes leading to the stirring tank, and the stirring shaft and the stationary shaft are connected via a transmission assembly.

2. The homogenization apparatus for pepper raw materials according to claim 1, wherein the transmission assembly comprises a primary bevel gear fixed to the sleeve and a secondary bevel gear which is arranged on the connecting plate and meshed with the primary bevel gear.

3. The homogenization apparatus for pepper raw materials according to claim 2, wherein the transmission assembly further comprises two transmission pulleys fixedly connected to the secondary bevel gear and the stirring shaft respectively, a transmission part is connected between the two transmission pulleys, and the transmission part comprises a belt or a chain.

4. The homogenization apparatus for pepper raw materials according to claim 3, wherein the connecting plate is fixedly connected to a right-angled plate, and the secondary bevel gear is arranged on the right-angled plate and rotatably connected to the right-angled plate.

5. The homogenization apparatus for pepper raw materials according to claim 4, wherein a housing is fixedly connected to the connecting plate at a position corresponding to the transmission pulley on the stirring shaft.

6. The homogenization apparatus for pepper raw materials according to claim 5, wherein the stirring barrel is rotatably connected to the base, the stirring barrel is connected to a driving means, the base is fixed with a rack, and the storage tank is fixedly connected to the rack.

7. The homogenization apparatus for pepper raw materials according to claim 6, wherein the stationary shaft is further fixedly connected with a straight flat plate, and the straight flat plate is rotatably connected with a feed pipe.

8. The homogenization apparatus for pepper raw materials according to claim 5, wherein the stirring barrel is fixedly connected to the base, the base is fixed with a rack, the storage tank is rotatably connected to the rack, and the storage tank is connected to a driving means.

9. The homogenization apparatus for pepper raw materials according to claim 1, wherein a discharge gap is provided between the sleeve and the stationary shaft, and the sleeve is communicated with a discharge pipe.

10. The homogenization apparatus for pepper raw materials according to claim 9, wherein the stirring part comprises a spiral blade.

\* \* \* \* \*